(12) United States Patent
Berndt et al.

(10) Patent No.: US 12,017,517 B2
(45) Date of Patent: Jun. 25, 2024

(54) AUTOMOTIVE AWNING SYSTEM

(71) Applicant: Curved Earth Designs Pty Ltd, Walliston (AU)

(72) Inventors: Timothy Berndt, Walliston (AU); Lee Kirkham, Walliston (AU)

(73) Assignee: Curved Earth Designs Pty Ltd, Walliston (AU)

( * ) Notice: Subject to any disclaimer, the term of this patent is extended or adjusted under 35 U.S.C. 154(b) by 113 days.

(21) Appl. No.: 17/905,471

(22) PCT Filed: Feb. 11, 2021

(86) PCT No.: PCT/AU2021/050117
§ 371 (c)(1),
(2) Date: Sep. 1, 2022

(87) PCT Pub. No.: WO2021/174288
PCT Pub. Date: Sep. 10, 2021

(65) Prior Publication Data
US 2023/0113908 A1      Apr. 13, 2023

(30) Foreign Application Priority Data

Mar. 3, 2020   (AU) .............................. 2020900627

(51) Int. Cl.
*B60J 3/00*      (2006.01)
*B60J 3/02*      (2006.01)
(52) U.S. Cl.
CPC   *B60J 3/005* (2013.01); *B60J 3/02* (2013.01)
(58) Field of Classification Search
CPC ............... B60J 3/02; B60J 3/002; B60J 3/005

USPC ................................................. 296/152, 97.1
See application file for complete search history.

(56) References Cited

U.S. PATENT DOCUMENTS

| | | | |
|---|---|---|---|
| 1,595,887 A | 8/1926 | Spaulding |
| 1,605,199 A | 11/1926 | Bacon |
| 1,705,960 A | 3/1929 | Clark |
| 1,811,900 A | 6/1931 | Spurgion |

(Continued)

FOREIGN PATENT DOCUMENTS

| | | |
|---|---|---|
| CN | 108215732 A | 8/2022 |
| DE | 3909937 A1 | 10/1990 |

(Continued)

OTHER PUBLICATIONS

International Search Report for International Application No. PCT/AU2021/050117, dated Apr. 15, 2021, 5 pages.

(Continued)

Primary Examiner — Joseph D. Pape
(74) Attorney, Agent, or Firm — TraskBritt

(57) ABSTRACT

An automotive awning system having an awning that is configured for operatively shielding an automotive cabin of a vehicle, such as truck, from the elements. The automotive awning system includes a mounting arrangement for mounting the awning to the vehicle, the mounting arrangement comprising at least one mounting for fastening the awning to the vehicle, the mounting defining a separation zone configured to demount when a predetermined impact force is applied to the awning, as well as a retractor configured to automatically retract the awning toward the vehicle upon demounting of the separation zone, so that the awning is protected from impact damage.

20 Claims, 4 Drawing Sheets

(56) References Cited

U.S. PATENT DOCUMENTS

| | | | |
|---|---|---|---|
| 2,627,913 A | | 2/1953 | Hill |
| 2,796,289 A | * | 6/1957 | Tocchetto ................ B60J 3/002 |
| | | | 296/95.1 |
| 5,636,892 A | * | 6/1997 | Gordon ................ B62D 35/005 |
| | | | 296/154 |
| 5,899,520 A | | 5/1999 | Bryant |
| 2002/0033616 A1 | | 3/2002 | Schlecht et al. |
| 2005/0016692 A1 | | 1/2005 | Glaser et al. |

FOREIGN PATENT DOCUMENTS

| | | |
|---|---|---|
| KR | 10-2074225 B1 | 2/2020 |
| WO | 2005/016676 A1 | 2/2005 |
| WO | 2018/112520 A1 | 6/2018 |

OTHER PUBLICATIONS

International Written Opinion for International Application No. PCT/AU2021/050117, dated Apr. 15, 2021, 5 pages.

* cited by examiner

AUTOMOTIVE AWNING SYSTEM

CROSS-REFERENCE TO RELATED APPLICATIONS

This application is a national phase entry under 35 U.S.C. § 371 of International Patent Application PCT/AU2021/050117, filed Feb. 11, 2021, designating the United States of America and published as International Patent Publication WO2021/174288 A1 on Sep. 10, 2021, which claims the benefit under Article 8 of the Patent Cooperation Treaty to Australian Application Serial No. 2020900627, filed Mar. 3, 2020.

TECHNICAL FIELD

This disclosure relates to the general automotive field and, more specifically, to an automotive awning system.

BACKGROUND

The following discussion of the background art is intended to facilitate an understanding of the present disclosure only. The discussion is not an acknowledgment or admission that any of the material referred to is or was part of the common general knowledge as at the priority date of the application.

Trucking is well-known in the art. A truck driver (commonly referred to as a trucker, teamster or driver in the United States and Canada, a truckie in Australia and New Zealand, and a lorry driver in Ireland and the United Kingdom) is a person who earns a living as the driver of a truck.

Truck drivers provide an essential service to industrialised societies by transporting finished goods and raw materials over land, typically to and from manufacturing plants, retail and distribution centres. Truck drivers are also responsible for inspecting their vehicles for mechanical items or issues relating to safe operation. For safety reasons, many countries regulate the number of consecutive hours per day a truck driver is allowed to be driving a truck.

Many truck drivers, especially long-haul truck drivers, may develop health problems because of their work environment. Truck drivers are more likely to suffer from obesity, hypertension, diabetes, skin cancers from long exposure to the sun and sleep disorders at rates that are higher than the national average.

Due to the conditions in which truck drivers spend their time, Applicant has identified a need in the art whereby a cabin of an automotive vehicle, such as a truck cabin, may be improved. The current disclosure was conceived with this goal in mind.

BRIEF SUMMARY

The skilled addressee is to appreciate that reference herein to "the elements" broadly refers to the forces that constitute the weather, such as sunlight, rain, snow and other forms of precipitation, wind, and/or the like.

According to an aspect of the disclosure, there is provided an automotive awning system comprising:
an awning configured for operatively shielding an automotive cabin of a vehicle from the elements; and
a mounting arrangement for mounting the awning to the vehicle, the mounting arrangement comprising:
  i) at least one mounting for fastening the awning to the vehicle, the mounting defining a separation zone configured to demount when a predetermined impact force is applied to the awning; and
  ii) a retractor configured to automatically retract the awning toward the vehicle upon demounting of the separation zone;
so that the awning is protected from impact damage.

Typically, the awning comprises a substantially rigid and/or resiliently flexible awning manufactured from a suitable material, such as metal, polymer, glass, fibreglass, rubber, and/or the like.

In an embodiment, the awning is manufactured from a photochromic material in order to regulate sunlight automatically into the cabin.

In an embodiment, the awning is manufactured from an electrochromic material in order to allow a user to regulate sunlight into the cabin.

Typically, the awning is configured to have an aerodynamic shape.

Typically, the awning is configured to shield the cabin via a suitable shape and/or dimension, and/or being mounted proximate a window and/or door of the vehicle.

Typically, the mounting arrangement for mounting the awning to the vehicle is configured to mount the awning in a cantilevered manner so that the awning protrudes over a window and/or door of the vehicle.

Typically, the at least one mounting is selected from a non-exhaustive group consisting of a nut and bolt, a screw, a rivet, a support strut or truss, an interference fit connector, an adhesive, or the like.

Typically, the separation zone configured to demount when a predetermined impact force is applied to the awning is selected from a non-exhaustive group consisting of a shear bolt, a zone of predetermined weakness, an interference fit connector, an electromechanical actuator, and/or the like. The skilled addressee is to appreciate that the separation zone is configured to demount upon impact of the predetermined force, i.e., the amount of force can be selected via suitable configuration of the separation zone of the mounting.

Typically, the separation zone is configured to demount in a permanent or temporary manner.

In an embodiment, the mounting is configurable such that an impact force necessary to demount the separation zone is user-configurable.

Typically, the mounting arrangement includes more than one mounting to facilitate mounting of the awning and/or retractor to the vehicle. Such additional mountings need not include the separation zone, requirements depending.

Typically, the retractor configured to automatically retract the awning toward the vehicle upon demounting of the separation zone include a biased hinge mounted to the vehicle, demounting of the separation zone allowing the hinge to retract the awning toward the vehicle.

Typically, the retractor is biased to retract the awning via a suitable spring-loaded mechanism.

In an embodiment, the retractor comprises an electromechanical actuator configured to automatically retract the awning toward the vehicle upon demounting of the separation zone.

Typically, the awning includes a blind spot camera and/or sensor user-directable toward a blind spot of the vehicle, in use.

Typically, the awning includes a rear-view camera user-directable toward a rear of the vehicle, in use.

Typically, the awning includes a reversing and/or blind spot light in order to illuminate toward a rear or a blind spot of the vehicle.

In an embodiment, the awning is adjustable to allow adjustment thereof relative to the vehicle cabin to suit user requirements.

In an embodiment, the awning includes a deployable mirror that is deployable between a storage position, in which the mirror is stowed within and/or against the awning, and an in-situ position, in which the mirror functions as a rear-view mirror for the vehicle.

In accordance with an aspect of the present disclosure, there is provided an automobile including an automotive awning system substantially as herein described and/or illustrated.

In accordance with a further aspect of the disclosure, there is provided an automotive awning system and an automobile including such a system, substantially as herein described and/or illustrated.

BRIEF DESCRIPTION OF THE DRAWINGS

The description will be made with reference to the accompanying drawings in which.

DETAILED DESCRIPTION

Figure 1:
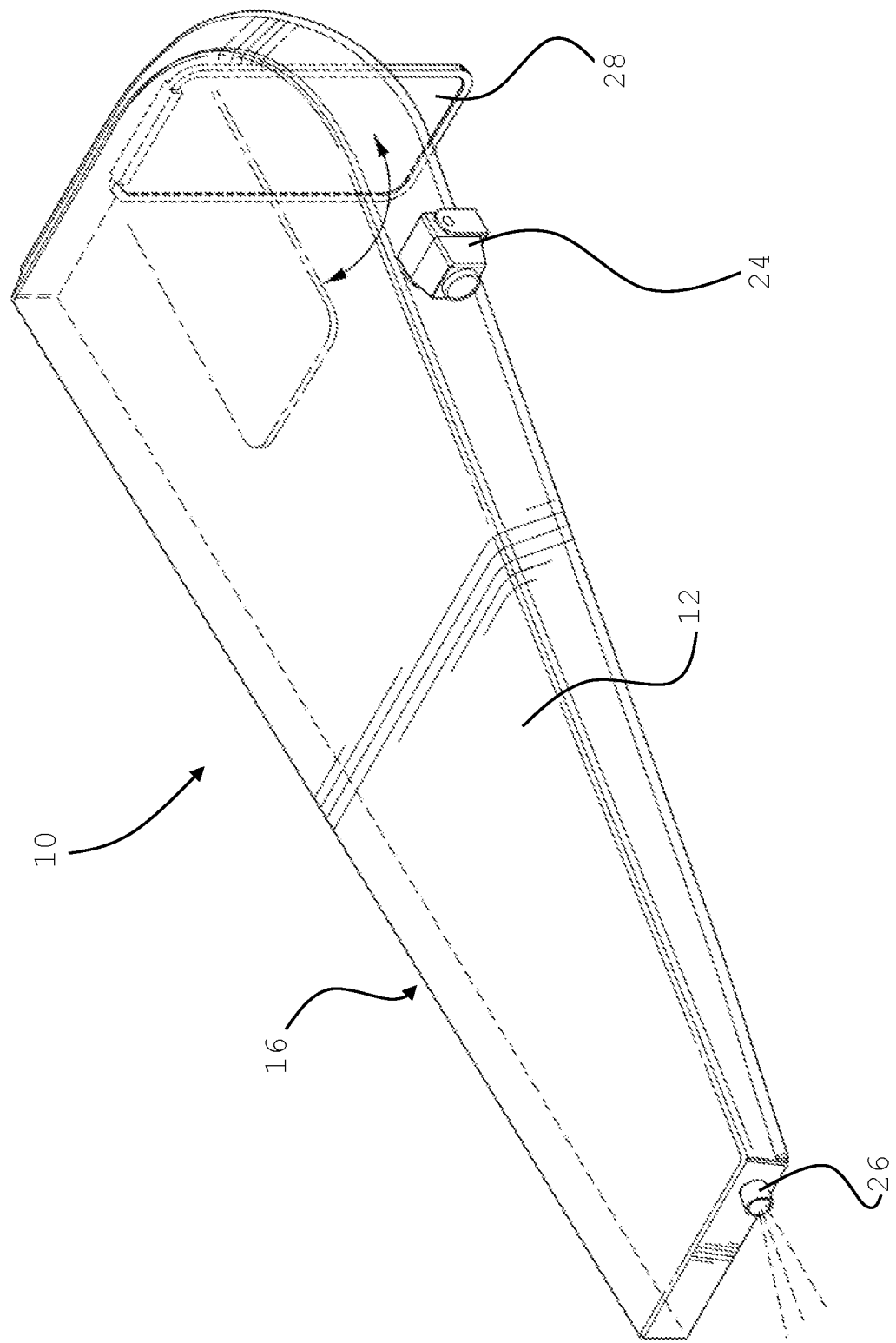
FIG. 1 is a diagrammatic perspective view representation of one embodiment of an automotive awning system, in accordance with an aspect of the present disclosure.
Figure 2:
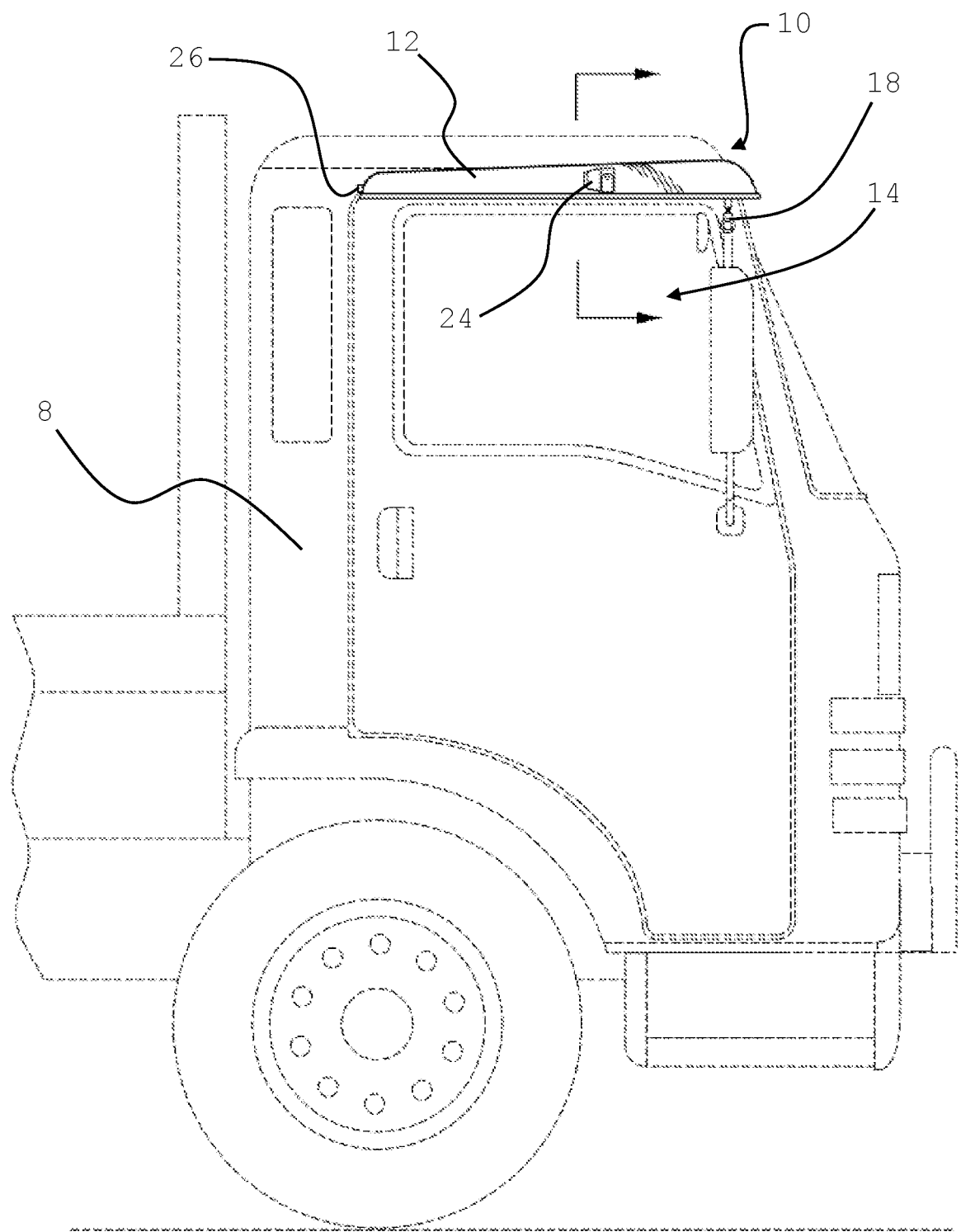
FIG. 2 is a diagrammatic side-view representation showing the automotive awning system of FIG. 1 mounted to a truck.

Further features of the present disclosure are more fully described in the following description of several non-limiting embodiments thereof. This description is included solely for the purposes of exemplifying the present disclosure to the skilled addressee. It should not be understood as a restriction on the broad summary, disclosure or description of the disclosure as set out above. In the figures, incorporated to illustrate features of the example embodiment or embodiments, like reference numerals are used to identify like parts throughout.

The present disclosure relates generally to improving an automotive cabin, such as a truck cabin, via shielding occupants of such a cabin from the elements, e.g., sun, rain, wind, etc. In such a manner, a comfort level of a person, such as a truck driver, within the automotive cabin can be improved, as described in more detail below.

Accordingly, with reference now to the accompanying figures, the present disclosure broadly provides for an automotive awning system 10. The automotive awning system 10 generally comprises an awning 12 that is configured for operatively shielding an automotive cabin 14 of a vehicle, such as truck 8, from the elements.

In a typical example, the awning 12 comprises a substantially rigid awning manufactured from a suitable material, such as metal, polymer, glass, fibreglass, or the like. In another example, the awning 12 may comprise a resiliently flexible material, such as a rigid rubber, or the like. The skilled addressee will appreciate that variations hereon are possible and within the scope of the present disclosure.

As the awning 12 is generally mounted proximate a window and/or door of the vehicle 8, as shown, the awning 12 is typically configured to have an aerodynamic shape.

The awning 12 is generally configured to shield the vehicle cabin 14 via having a suitable shape and/or dimension, as is known in the art.

In one embodiment, the awning 12 may be manufactured from, or portions thereof may comprise, a photochromic material in order to regulate sunlight automatically into the vehicle cabin 14. For example, the photochromic material can darken the more sunlight is incident thereon. Similarly, in one embodiment, the awning 12 may be manufactured from, or portions thereof may comprise, an electrochromic material in order to allow a user to regulate sunlight into the vehicle cabin 14. Similarly, an opacity, transparency, translucency and/or colour of the awning 12 may be configured to be user-configurable. For example, a yellowish see-through tint may improve an ambiance within the cabin during the day, whereas a reddish see-through tint may improve night-time ambiance, or the like.

In the exemplified embodiment, the awning 12 includes a rear-view and/or blind spot camera 24 that may be user-directable toward a blind spot and/or toward a rear of the vehicle 8, in use. The awning 12 may further include a reversing and/or blind spot light 26 in order to illuminate toward a rear and/or a blind spot of the vehicle. Similarly, a blind spot sensor (not shown) may also or alternatively be included, as is known in the art. The skilled addressee is to appreciate that a position of either the blind spot camera 24 or blind spot light 26 on the awning 12 can be varied according to requirements.

The automotive awning system 10 further includes a mounting arrangement 16 for mounting the awning 12 to the vehicle 8. The mounting arrangement 16 generally comprises at least one mounting 18 for fastening the awning 12 to the vehicle 8, the at least one mounting 18 defining a separation zone 22 that is configured to demount when a predetermined impact force is applied to the awning 12. In addition, the mounting arrangement 16 includes a retractor 20 configured to automatically retract the awning 12 toward the vehicle 8, i.e., away from a source of the impact force, upon demounting of the separation zone 22. In this manner, the awning 12 is protectable from impact damage by being quickly removed or retracted away from a source of such impact force.

As will be appreciated by the skilled addressee, the mounting 18 may include a nut and bolt, a screw, a rivet, a support strut or truss, an interference fit connector, an adhesive, or the like. In the exemplified embodiment, the at least one mounting 18 comprises an interference-fit ball-and-socket connector, but variations hereon are possible and within the scope of the present disclosure.

For example, the separation zone 22 of the at least one mounting 18 configured to demount when a predetermined impact force is applied to the awning 12 may also include a shear bolt, a zone of predetermined weakness, an interference fit connector, or the like. The skilled addressee is to appreciate that the separation zone 22 is configured to demount upon impact of the predetermined force, i.e., the amount of force can be selected via suitable configuration of the separation zone 22 of the at least one mounting 18.

It is further to be appreciated that the separation zone 22 may be configured to demount in a permanent or temporary manner, i.e., the at least one mounting may break, or it may demount in a temporary manner, as per the interference-fit ball-and-socket connector of the exemplified embodiment. The skilled addressee will also appreciate that the at least one mounting 18 may be configurable such that an impact force necessary to demount the separation zone 22 is user-configurable, i.e., an adjustable separation zone 22, or the like.

Typically, the mounting arrangement 16 includes more than one mounting 18 to facilitate mounting of the awning 12 and/or retractor 20 to the vehicle 8. Such additional mountings 18 need not include the separation zone 22, requirements depending. For example, in the exemplified embodiment, the at least one mounting 18 incorporating the separation zone 22 mounts the awning to a conventional rear-view mirror of the truck 8, with additional mountings 18 attaching the awning to a side of the truck 8, as shown.

In an embodiment, the awning 12 is adjustable to allow adjustment thereof relative to the vehicle cabin 14 to suit user requirements. For example, in the exemplified embodiment, the mounting arrangement 16 is configured to mount the awning 12 in a cantilevered manner so that the awning 12 protrudes over a window and/or door of the vehicle 8, as shown. The at least one mounting 18 is also adjustable in order to facilitate adjustment of the awning 12.

In a yet further embodiment, mounting arrangement 16 and/or retractor 20 may comprise an electromechanical actuator (not shown) that is configured to automatically retract the awning toward the vehicle upon demounting of the separation zone. Similarly, such an electromechanical actuator may be configured to extend the awning after retraction upon a user input, or the like. Such an actuator may include a linear actuator or arrangements based on engineering principles known in the art.

Figure 3:
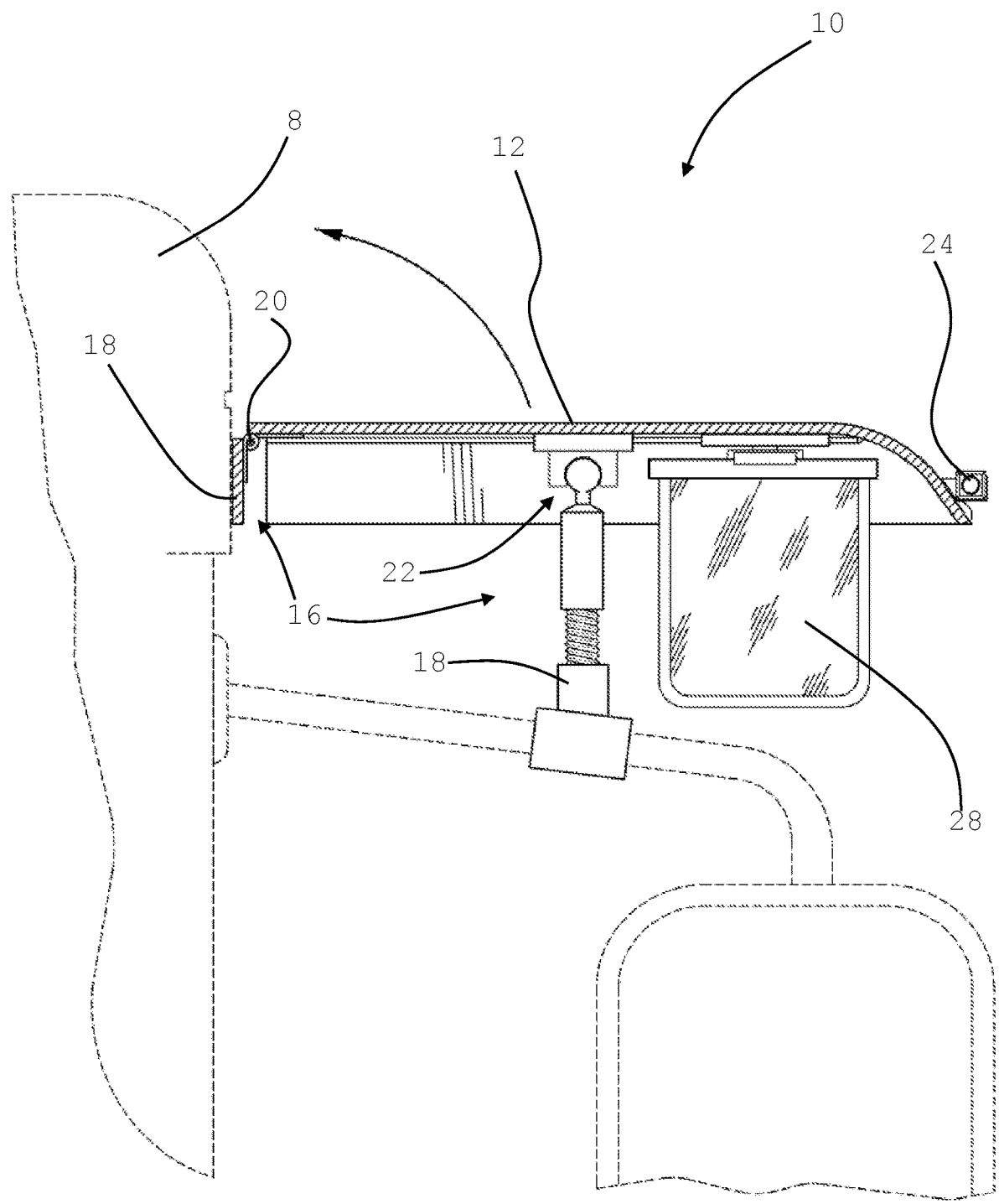
FIG. 3 is diagrammatic rear-sectional representation of the awning system mounted to the truck of FIG. 2.
Figure 4:
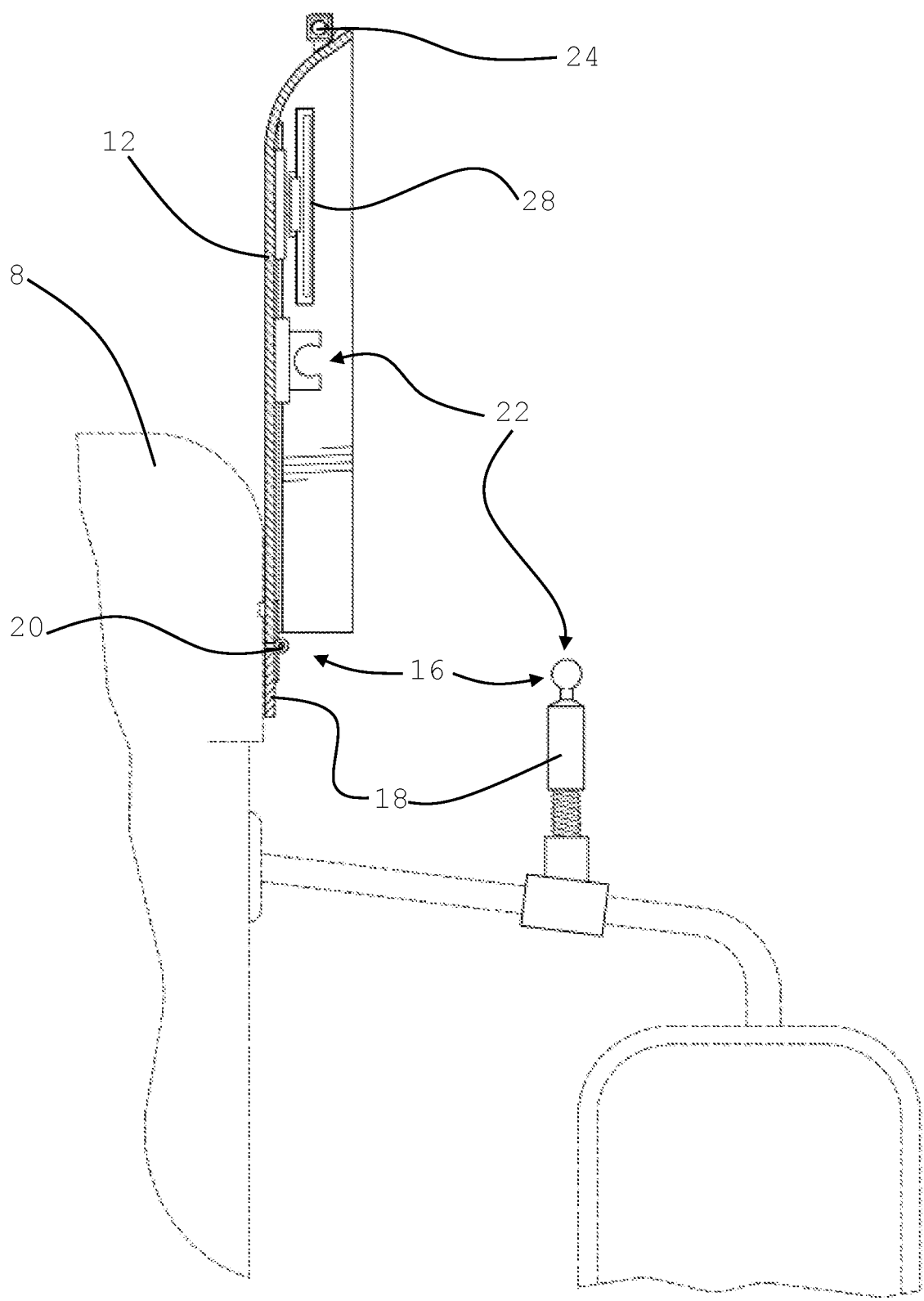
FIG. 4 is a diagrammatic rear-sectional representation of the awning system of FIG. 3 with the awning retracted toward the truck.

In one embodiment, the awning includes a deployable mirror 28 that is deployable between a storage position, in which the deployable mirror 28 is stowed within and/or against the awning 12, as shown in FIG. 4, and an in-situ position, in which the mirror functions as a rear-view mirror for the vehicle 8, as shown in FIG. 3. The skilled address is to appreciate that, should the truck 8 collide with another object, the impact force may damage the conventional rear-view mirror whilst the awning is safely retracted via demounting of the separation zone 22. In such an occurrence, the deployable mirror 28 can be used.

Typically, the retractor 20 configured to automatically retract the awning 12 toward the vehicle 8 upon demounting of the separation zone 22 include a suitable spring-loaded mechanism. In the exemplified embodiment, the retractor 20 biased to retract the awning 12 comprises a biased hinge mounted to the vehicle 8, as shown, with demounting of the separation zone 22 allowing the hinge to retract the awning 12 toward the vehicle, i.e., a spring-loaded hinge. Again, variations hereon are possible and within the scope of the present disclosure.

The skilled address is to appreciate that the present disclosure further includes an automobile having an automotive awning system 10, substantially as herein described and/or illustrated. Such an automobile may include any suitable vehicle, such as a car, a truck, or the like.

Applicant believes it particularly advantageous that the present disclosure provides for a means for shielding a vehicle cabin from sun, rain, snow, etc. Automotive awning system 10 is also generally able to provide anti-glare protection for a dashboard and mirrors of the cabin, and may reduce direct sunlight into the cabin to reduce overall cabin heat, in turn increasing the efficiency of a cabin air conditioning system. The disclosure is also believed to improve ambiance within the cabin, thereby improving occupant comfort.

Optional embodiments of the present disclosure may also be said to broadly consist in the parts, elements and features referred to or indicated herein, individually or collectively, in any or all combinations of two or more of the parts, elements or features, and wherein specific integers are mentioned herein that have known equivalents in the art to which the disclosure relates, such known equivalents are deemed to be incorporated herein as if individually set forth. In the example embodiments, well-known processes, well-known device structures, and well-known technologies are not described in detail, as such will be readily understood by the skilled addressee.

The use of the terms "a," "an," "said," "the," and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items. No language in the specification should be construed as indicating any non-claimed subject matter as essential to the practice of the claimed subject matter.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It is to be appreciated that reference to "one example" or "an example" of the disclosure, or similar exemplary language (e.g., "such as") herein, is not made in an exclusive sense. Various substantially and specifically practical and useful exemplary embodiments of the claimed subject matter are described herein, textually and/or graphically, for carrying out the claimed subject matter.

Accordingly, one example may exemplify certain aspects of the disclosure, while other aspects are exemplified in a different example. These examples are intended to assist the skilled person in performing the disclosure and are not intended to limit the overall scope of the disclosure in any way unless the context clearly indicates otherwise. Variations (e.g., modifications and/or enhancements) of one or more embodiments described herein might become apparent to those of ordinary skill in the art upon reading this application. The inventor(s) expects skilled artisans to employ such variations as appropriate, and the inventor(s) intends for the claimed subject matter to be practiced other than as specifically described herein.

The invention claimed is:

1. An automotive awning system, comprising:
   an awning configured for operatively shielding an automotive cabin of a vehicle from elements; and
   a mounting arrangement for mounting the awning to the vehicle, such that the awning is protected from impact damage, the mounting arrangement comprising:

at least one mounting for fastening the awning to the vehicle, the mounting defining a separation zone configured to demount when an impact force is applied to the awning; and a retractor configured to automatically retract the awning toward the vehicle upon demounting of the separation zone.

2. The automotive awning system of claim 1, wherein the awning comprises a substantially rigid awning manufactured from one or more of metal, polymer, glass, and fibreglass.

3. The automotive awning system of claim 1, wherein the awning is manufactured from a photochromic material so as to regulate sunlight automatically into the automotive cabin.

4. The automotive awning system of claim 1, wherein the awning comprises a resiliently flexible awning manufactured from rubber.

5. The automotive awning system of claim 1, wherein the awning is manufactured from an electrochromic material so as to allow a user to regulate sunlight into the automotive cabin.

6. The automotive awning system of claim 1, wherein the awning has an aerodynamic shape.

7. The automotive awning system of claim 1, wherein the awning is configured to shield the automotive cabin via one or more of:
one or more of shape and dimension; and
being mounted proximate one or more of a window and a door of the vehicle.

8. The automotive awning system of claim 1, wherein the mounting arrangement for mounting the awning to the vehicle is configured to mount the awning in a cantilevered manner so that the awning protrudes over one or more of a window and a door of the vehicle.

9. The automotive awning system of claim 1, wherein the at least one mounting is selected from a nut and bolt, a screw, a rivet, a support strut or truss, an interference fit connector, and an adhesive.

10. The automotive awning system of claim 1, wherein the separation zone configured to demount when an impact force is applied to the awning is selected from a shear bolt, a zone of predetermined weakness, an interference fit connector, and an electromechanical actuator.

11. The automotive awning system of claim 1, wherein the separation zone is configured to demount in a permanent or temporary manner.

12. The automotive awning system of claim 1, wherein the mounting is configurable such that the impact force necessary to demount the separation zone is user-configurable.

13. The automotive awning system of claim 1, wherein the mounting arrangement includes more than one mounting to facilitate mounting of one or more of the awning and the retractor to the vehicle.

14. The automotive awning system of claim 1, wherein the retractor configured to automatically retract the awning toward the vehicle upon demounting of the separation zone include a biased hinge mounted to the vehicle, demounting of the separation zone allowing the biased hinge to retract the awning toward the vehicle.

15. The automotive awning system of claim 1, wherein the retractor is biased to retract the awning via a suitable spring-loaded mechanism.

16. The automotive awning system of claim 1, wherein the awning includes one or more of a blind spot camera and a sensor user-directable toward a blind spot of the vehicle, in use.

17. The automotive awning system of claim 1, wherein the awning includes a rear-view camera user-directable toward a rear of the vehicle, in use.

18. The automotive awning system of claim 1, wherein the awning includes one or more of a reversing light and a blind spot light in order to illuminate toward a rear or a blind spot of the vehicle.

19. The automotive awning system of claim 1, wherein the awning is adjustable to allow adjustment thereof relative to the automotive cabin to suit user requirements.

20. The automotive awning system of claim 1, wherein the awning includes a deployable mirror that is deployable between:
a storage position, in which the deployable mirror stowed in one or more of within and against the awning; and
an in-situ position, in which the deployable mirror functions as a rear-view mirror for the vehicle.

* * * * *